US008286878B2

(12) United States Patent
Nunnink

(10) Patent No.: US 8,286,878 B2
(45) Date of Patent: *Oct. 16, 2012

(54) HAND HELD SYMBOLOGY READER ILLUMINATION DIFFUSER

(75) Inventor: Laurens Nunnink, Simpelveld (NL)

(73) Assignee: Cognex Technology and Investment Corporation, Mt. View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/573,402

(22) Filed: Oct. 5, 2009

(65) Prior Publication Data

US 2010/0020539 A1 Jan. 28, 2010

Related U.S. Application Data

(63) Continuation of application No. 11/014,478, filed on Dec. 16, 2004, now Pat. No. 7,617,984.

(51) Int. Cl.
*G06K 7/10* (2006.01)
(52) U.S. Cl. ................................. 235/472.01
(58) Field of Classification Search .... 235/462.01–462.49, 454, 472.01–472.03
See application file for complete search history.

(56) References Cited

U.S. PATENT DOCUMENTS

| | | | |
|---|---|---|---|
| 2,357,378 | A | 9/1944 | Benford |
| 3,726,998 | A | 4/1973 | Szpak et al. |
| 3,857,626 | A | 12/1974 | Rosenberger et al. |
| 3,961,198 | A | 6/1976 | Aungst et al. |
| 4,240,748 | A * | 12/1980 | Blanc et al. ............... 356/138 |
| 4,282,425 | A | 4/1981 | Chadima, et al. |
| 4,570,057 | A | 1/1986 | Chadima, Jr. et al. |
| 4,743,773 | A | 1/1988 | Katana et al. |
| 4,766,300 | A | 8/1988 | Chadima, Jr. et al. |
| 4,820,911 | A | 4/1989 | Arackellian et al. |
| 4,894,523 | A | 1/1990 | Chadima, Jr. et al. |
| 4,969,037 | A | 11/1990 | Poleschinski et al. |
| 5,019,699 | A | 5/1991 | Koenck |
| 5,149,948 | A | 9/1992 | Chisholm |
| 5,177,346 | A | 1/1993 | Chisholm |
| 5,202,817 | A | 4/1993 | Koenck |
| 5,227,614 | A | 7/1993 | Danielson et al. |
| 5,239,169 | A | 8/1993 | Thomas |
| 5,258,606 | A | 11/1993 | Chadima, Jr. et al. |
| 5,291,009 | A | 3/1994 | Roustaei |
| 5,313,373 | A | 5/1994 | Bjorner et al. |
| 5,319,182 | A | 6/1994 | Havens et al. |
| 5,331,176 | A | 7/1994 | San't Anselmo et al. |

(Continued)

FOREIGN PATENT DOCUMENTS

CN 1426570 6/2003

(Continued)

OTHER PUBLICATIONS

"Vision-Supplies.com", Siemens LytePipe 1.5" x 30, 1999.

(Continued)

*Primary Examiner* — Jamara Franklin

(57) ABSTRACT

A hand held industrial identification symbol reader projects diffuse illumination onto a region of interest to produce high contrast images of symbols. The diffuse illumination is particularly well suited for producing images of symbols that are marked directly on objects. The diffuse illumination is created through the use of an optically translucent diffuser having a generally tapered shape that distributes diffuse illumination throughout the field of view of the reader. The diffuse illumination can be supplemented with dark field illumination using selectively actuated illumination sources.

24 Claims, 13 Drawing Sheets

U.S. PATENT DOCUMENTS

| | | | |
|---|---|---|---|
| 5,349,172 A | 9/1994 | Roustaei | |
| 5,354,977 A | 10/1994 | Roustaie | |
| 5,359,185 A | 10/1994 | Hanson | |
| 5,367,439 A | 11/1994 | Maver et al. | |
| 5,374,817 A | 12/1994 | Bard et al. | |
| 5,378,883 A | 1/1995 | Batterman et al. | |
| 5,406,060 A | 4/1995 | Gitin | |
| 5,408,084 A | 4/1995 | Brandorff et al. | |
| 5,414,251 A | 5/1995 | Durbin | |
| 5,442,247 A | 6/1995 | Tavislan et al. | |
| 5,430,285 A | 7/1995 | Karpen et al. | |
| 5,449,892 A | 9/1995 | Yamada | |
| 5,461,417 A | 10/1995 | White et al. | |
| 5,469,294 A | 11/1995 | Wilt et al. | |
| 5,481,098 A | 1/1996 | Davis et al. | |
| 5,484,994 A | 1/1996 | Roustaei | |
| 5,500,516 A | 3/1996 | Durbin | |
| 5,504,317 A | 4/1996 | Takahashi | |
| 5,504,367 A | 4/1996 | Wang et al. | |
| 5,514,858 A | 5/1996 | Ackley | |
| 5,515,452 A | 5/1996 | Penkethman et al. | |
| 5,532,467 A | 7/1996 | Roustaei et al. | |
| 5,569,902 A | 10/1996 | Wood et al. | |
| 5,576,527 A * | 11/1996 | Sawanobori | 235/455 |
| 5,585,616 A | 12/1996 | Roxby et al. | |
| 5,586,212 A | 12/1996 | McConica et al. | |
| 5,591,955 A | 1/1997 | Laser | |
| 5,598,007 A | 1/1997 | Bunce et al. | |
| 5,606,160 A | 2/1997 | Tani et al. | |
| 5,619,029 A * | 4/1997 | Roxby et al. | 235/462.06 |
| 5,623,137 A | 4/1997 | Powers et al. | |
| 5,654,533 A | 8/1997 | Suzuki et al. | |
| 5,654,540 A | 8/1997 | Stanton et al. | |
| 5,659,167 A | 8/1997 | Wang et al. | |
| 5,684,290 A | 11/1997 | Arackellian et al. | |
| 5,697,699 A | 12/1997 | Seo et al. | |
| 5,703,348 A | 12/1997 | Suzuki et al. | |
| 5,715,095 A | 2/1998 | Hiratsuka et al. | |
| 5,723,868 A | 3/1998 | Hammond, Jr. et al. | |
| 5,734,153 A | 3/1998 | Swartz et al. | |
| 5,743,633 A | 4/1998 | Chau et al. | |
| 5,750,974 A | 5/1998 | Sasaki et al. | |
| 5,756,981 A | 5/1998 | Roustaei et al. | |
| 5,773,810 A | 6/1998 | Hussey et al. | |
| 5,777,314 A | 7/1998 | Roustaei | |
| 5,780,834 A | 7/1998 | Havens et al. | |
| 5,783,811 A | 7/1998 | Feng et al. | |
| 5,786,586 A * | 7/1998 | Pidhirny et al. | 235/472.01 |
| 5,793,033 A | 8/1998 | Feng et al. | |
| 5,811,784 A | 9/1998 | Tausch et al. | |
| 5,463,214 A | 10/1998 | Longacre, Jr. et al. | |
| 5,834,754 A | 11/1998 | Feng et al. | |
| 5,859,418 A | 1/1999 | Li et al. | |
| 5,861,910 A | 1/1999 | McGarry et al. | |
| 5,886,338 A | 3/1999 | Arackellian et al. | |
| 5,894,348 A | 5/1999 | Bacchi et al. | |
| 5,903,391 A * | 5/1999 | Toshima et al. | 359/599 |
| 5,907,148 A | 7/1999 | Iwafuchi et al. | |
| 5,920,643 A | 7/1999 | White et al. | |
| 5,923,020 A | 7/1999 | Kurokawa et al. | |
| 5,949,057 A | 9/1999 | Feng | |
| 5,696,321 A | 10/1999 | Danielson et al. | |
| 5,979,763 A | 11/1999 | Wang et al. | |
| 5,984,494 A | 11/1999 | Chapman et al. | |
| 5,992,751 A | 11/1999 | Laser | |
| 6,011,586 A | 1/2000 | Lepoir et al. | |
| 6,022,124 A | 2/2000 | Bourn et al. | |
| 6,033,090 A | 3/2000 | Seo | |
| 6,034,379 A | 3/2000 | Bunte et al. | |
| 6,036,095 A | 3/2000 | Seo | |
| 6,039,254 A | 3/2000 | Froese-Peeck et al. | |
| 6,039,255 A | 3/2000 | Seo | |
| 6,042,012 A | 3/2000 | Olmstead et al. | |
| 6,045,047 A | 4/2000 | Pidhimy et al. | |
| 6,060,722 A | 5/2000 | Havens et al. | |
| 6,065,678 A | 5/2000 | Li et al. | |
| 6,073,852 A | 6/2000 | Seo | |
| 6,105,869 A | 8/2000 | Scharf et al. | |
| 6,119,939 A | 9/2000 | Schwartz et al. | |
| 6,141,046 A | 10/2000 | Roth et al. | |
| 6,158,661 A | 12/2000 | Chadima, Jr. et al. | |
| 6,164,544 A | 12/2000 | Schwartz et al. | |
| 6,210,013 B1 | 4/2001 | Bousfield | |
| 6,223,986 B1 | 5/2001 | Bobba et al. | |
| 6,234,397 B1 | 5/2001 | He et al. | |
| 6,247,645 B1 | 6/2001 | Harris et al. | |
| 6,249,008 B1 | 6/2001 | Bunte et al. | |
| 6,250,551 B1 | 6/2001 | He et al. | |
| 6,260,763 B1 | 7/2001 | Svetal | |
| 6,267,294 B1 | 7/2001 | Stern et al. | |
| 6,283,374 B1 | 9/2001 | Fantone et al. | |
| 6,621,065 B1 | 10/2001 | Fukumoto et al. | |
| 6,340,114 B1 | 1/2002 | Correa et al. | |
| 6,341,878 B1 | 1/2002 | Chiang | |
| 6,347,163 B2 | 2/2002 | Roustaei | |
| 6,347,874 B1 | 2/2002 | Boyd et al. | |
| 6,352,204 B2 | 3/2002 | Hattersley et al. | |
| 6,360,948 B1 | 3/2002 | Yang et al. | |
| 6,371,374 B1 | 4/2002 | Schwartz et al. | |
| 6,385,352 B1 | 5/2002 | Roustaei | |
| 6,385,507 B1 | 5/2002 | Buijtels et al. | |
| 6,394,349 B1 | 5/2002 | Shigekusa et al. | |
| 6,405,925 B2 | 6/2002 | He et al. | |
| 6,429,934 B1 | 8/2002 | Dunn et al. | |
| 6,435,411 B1 | 8/2002 | Massieu et al. | |
| 6,491,223 B1 | 12/2002 | Longacre, Jr. et al. | |
| 6,505,778 B1 | 1/2003 | Reddersen et al. | |
| 6,513,714 B1 | 2/2003 | Davis et al. | |
| 6,542,238 B1 | 4/2003 | Tsuboi | |
| 6,547,146 B1 | 4/2003 | Meksavan et al. | |
| 6,575,367 B1 | 6/2003 | Longacre, Jr. | |
| 6,581,838 B1 | 6/2003 | Meksavan et al. | |
| 6,595,422 B1 | 6/2003 | Doljack | |
| 6,592,040 B2 | 7/2003 | Barkan et al. | |
| 6,598,797 B2 | 7/2003 | Lee | |
| 6,601,768 B2 | 8/2003 | McCall et al. | |
| 6,607,128 B1 | 8/2003 | Schwartz et al. | |
| 6,607,132 B1 | 8/2003 | Dvorkis et al. | |
| 6,659,350 B2 | 12/2003 | Schwartz et al. | |
| 6,661,521 B1 | 12/2003 | Stern | |
| 6,681,037 B1 | 1/2004 | Koljonen | |
| 6,689,998 B1 | 2/2004 | Bremer | |
| 6,729,546 B2 | 5/2004 | Roustaei | |
| 6,760,165 B2 | 6/2004 | Wulff et al. | |
| 6,803,088 B2 | 10/2004 | Kaminsky et al. | |
| 6,809,847 B2 | 10/2004 | McQueen | |
| 6,831,290 B2 | 12/2004 | Mentzer | |
| 6,832,725 B2 | 12/2004 | Gardiner et al. | |
| 6,854,650 B2 * | 2/2005 | Hattersley et al. | 235/454 |
| 6,860,428 B1 | 3/2005 | Dowling et al. | |
| 6,914,679 B2 | 7/2005 | Nettekoven et al. | |
| 7,021,542 B2 | 4/2006 | Patel et al. | |
| 7,025,271 B2 | 4/2006 | Dvorkis et al. | |
| 7,025,272 B2 | 4/2006 | Yavid et al. | |
| 7,025,273 B2 | 4/2006 | Breytman et al. | |
| 7,038,853 B2 | 5/2006 | Li et al. | |
| 7,044,377 B2 | 5/2006 | Patel et al. | |
| 7,090,132 B2 | 8/2006 | Havens et al. | |
| 7,128,266 B2 | 10/2006 | Zhu et al. | |
| 7,131,587 B2 | 11/2006 | He et al. | |
| 7,159,764 B1 | 1/2007 | White et al. | |
| 7,163,149 B2 | 1/2007 | He et al. | |
| 7,187,825 B2 | 3/2007 | Lim et al. | |
| 7,204,418 B2 | 4/2007 | Josep et al. | |
| 7,204,420 B2 | 4/2007 | Barkan et al. | |
| 7,180,052 B1 | 5/2007 | Barkan et al. | |
| 7,224,540 B2 | 5/2007 | Olmstead et al. | |
| 7,225,989 B2 | 6/2007 | Zhu et al. | |
| 7,240,844 B2 | 7/2007 | Zhu et al. | |
| 7,253,384 B2 | 8/2007 | Barnes et al. | |
| 7,267,282 B2 | 9/2007 | Zhu et al. | |
| 7,270,274 B2 | 9/2007 | Hennick et al. | |
| 7,278,575 B2 | 10/2007 | Zhu et al. | |
| 7,281,661 B2 | 10/2007 | Zhu et al. | |
| 7,296,749 B2 | 11/2007 | Massieu | |
| 7,306,155 B2 | 12/2007 | Hennick et al. | |
| 7,314,173 B2 | 1/2008 | Philyaw et al. | |

| | | |
|---|---|---|
| 7,331,524 B2 | 2/2008 | Vinogradov et al. |
| 7,451,917 B2 | 11/2008 | McCall et al. |
| 7,490,774 B2 | 2/2009 | Zhu et al. |
| 7,360,705 B2 | 4/2009 | Jolivet et al. |
| 7,520,434 B2 | 4/2009 | Jolivet et al. |
| 7,568,628 B2 | 8/2009 | Wang et al. |
| 7,604,174 B2 | 10/2009 | Gerst, III et al. |
| 7,617,984 B2 | 11/2009 | Nunnink |
| 7,823,783 B2 | 11/2010 | Gerst et al. |
| 8,061,613 B2 | 11/2011 | Gerst et al. |
| 8,061,614 B2 | 11/2011 | Gerst et al. |
| 2001/0027999 A1 | 10/2001 | Lee |
| 2001/0026301 A1 | 11/2001 | Sick |
| 2002/0000472 A1 | 1/2002 | Hattersley et al. |
| 2002/0030094 A1 | 3/2002 | Curry et al. |
| 2002/0074403 A1 | 6/2002 | Krichever et al. |
| 2002/0096566 A1 | 7/2002 | Schwartz et al. |
| 2002/0104887 A1 | 8/2002 | Schlieffers et al. |
| 2002/0125322 A1 | 9/2002 | McCall et al. |
| 2002/0170970 A1 | 11/2002 | Ehrhart |
| 2003/0001018 A1 | 1/2003 | Hussey et al. |
| 2003/0029917 A1 | 2/2003 | Hennick et al. |
| 2003/0034394 A1 | 2/2003 | Gannon et al. |
| 2003/0058631 A1 | 3/2003 | Yoneda |
| 2003/0062413 A1 | 4/2003 | Gardiner et al. |
| 2003/0062418 A1 | 4/2003 | Barber et al. |
| 2003/0080187 A1 | 5/2003 | Piva et al. |
| 2003/0080189 A1 | 5/2003 | Patel et al. |
| 2003/0163623 A1 | 8/2003 | Yeung |
| 2004/0069855 A1 | 4/2004 | Patel et al. |
| 2004/0156539 A1 | 8/2004 | Jansson et al. |
| 2004/0217173 A1 | 11/2004 | Lizotte et al. |
| 2004/0238637 A1 | 12/2004 | Russell et al. |
| 2005/0029439 A1 | 2/2005 | Benedict |
| 2005/0045725 A1 | 3/2005 | Gurevich et al. |
| 2005/0047723 A1 | 3/2005 | Li |
| 2005/0087601 A1 | 4/2005 | Gerst et al. |
| 2005/0117144 A1 | 6/2005 | Greenway et al. |
| 2005/0180037 A1 | 8/2005 | Masterson |
| 2005/0199725 A1 | 9/2005 | Caraen et al. |
| 2006/0027657 A1 | 2/2006 | Ninnink et al. |
| 2006/0027659 A1 | 2/2006 | Patel et al. |
| 2006/0032921 A1 | 2/2006 | Gerst et al. |
| 2006/0060653 A1 | 3/2006 | Wittenberg et al. |
| 2006/0131419 A1 | 6/2006 | Nunnink |
| 2006/0133757 A1 | 6/2006 | Nunnink |
| 2006/0266840 A1 | 11/2006 | Vinogradov et al. |
| 2007/0090193 A1 | 4/2007 | Nunnink et al. |
| 2007/0152064 A1 | 7/2007 | Nunnink et al. |
| 2007/0206183 A1 | 9/2007 | Lebens |
| 2008/0170380 A1 | 7/2008 | Pastore |

FOREIGN PATENT DOCUMENTS

| | | |
|---|---|---|
| DE | 3737792 | 5/1989 |
| DE | 3931044 | 3/1991 |
| DE | 4003983 | 8/1991 |
| DE | 4123916 | 1/1992 |
| DE | 10026301 | 11/2001 |
| EP | 0 185 782 | 3/1989 |
| EP | 0356680 | 3/1990 |
| EP | 1158460 | 11/2001 |
| JP | 53-62387 | 6/1978 |
| JP | 59163677 | 9/1984 |
| JP | S6134681 | 2/1986 |
| JP | 6318209 | 1/1988 |
| JP | 04 223583 | 8/1992 |
| JP | 06124361 | 5/1994 |
| JP | 08129597 | 5/1996 |
| JP | 08-287176 | 11/1996 |
| JP | 962831 | 3/1997 |
| JP | 10134133 | 5/1998 |
| JP | 2000-231600 | 8/2000 |
| JP | 2001-307011 | 11/2001 |
| JP | 200728088 | 1/2007 |
| JP | 2007546762 | 11/2007 |
| WO | WO-9112489 | 8/1991 |
| WO | WO-92/16909 | 10/1992 |
| WO | WO-99/49347 | 9/1999 |
| WO | WO-00/16073 | 3/2000 |
| WO | WO-01/63258 | 8/2001 |
| WO | WO-01/65469 | 9/2001 |
| WO | WO-02/075637 | 9/2002 |
| WO | WO-2004/006438 | 1/2004 |
| WO | WO-2005/043449 | 5/2005 |

OTHER PUBLICATIONS

Cognex Corporation, "50mm Ring Light Image Formation System", For the In-Sight 5000 series ID Readers, 2006.

Cognex Corporation, "AcuReader/OCR", Accurate, Fast Wafer Identification, 1995-1996.

Cognex Corporation, "DataMan 6500 Series", Quick Reference 2004.

Cognex Corporation, "DataMan 6500 Series", Quick Reference Guide, Aug. 10, 2004.

Cognex Corporation, "DataMan 7500 Series Handheld Models", Cognex Machine Vision System and Machine Vision Sensors, 2009.

Cognex Corporation, "DataMan Handheld ID Readers", 2005.

Cognex Corporation, "Diffuse Ring Light Installation Instructions", InSight, 2006.

* cited by examiner

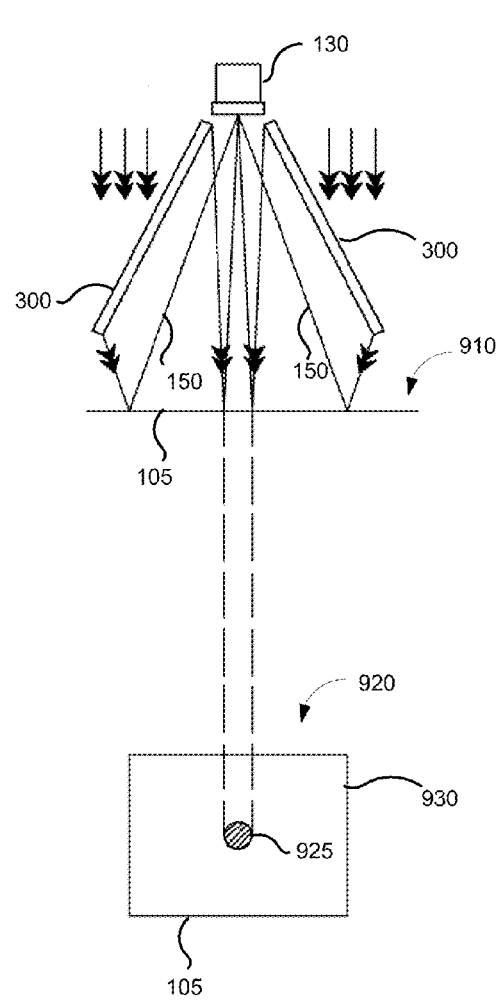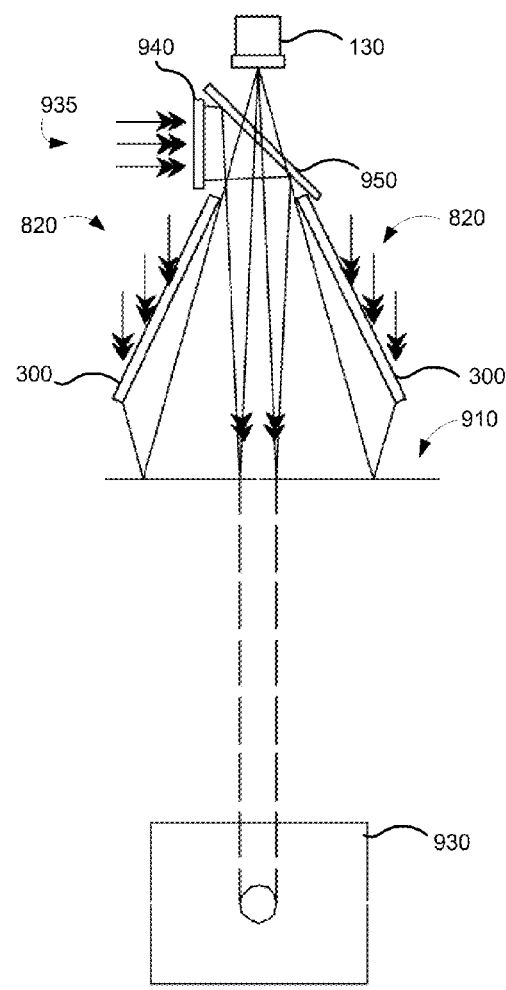
FIG. 12                                   FIG. 13

HAND HELD SYMBOLOGY READER ILLUMINATION DIFFUSER

CROSS REFERENCE TO RELATED APPLICATIONS

This application is a continuation of U.S. patent application Ser. No. 11/014,478, filed Dec. 16, 2004 now U.S. Pat. No. 7,617,984.

BACKGROUND OF THE INVENTION

1. Field of the Invention

This invention relates to illumination for image acquisition devices, and more particularly, to illumination for image acquisition devices used for reading industrial identification codes.

2. Description of the Related Art

Machine vision systems use image acquisition devices that include camera sensors to deliver information on a viewed subject. The system then interprets this information according to a variety of algorithms to perform a programmed decision-making and/or identification function. For an image to be most effectively acquired by a sensor in the visible, and near visible light range, the subject should be properly illuminated.

In the example of identification symbol scanning using an image sensor, good lighting is highly desirable. Identification symbol scanning entails the aiming of an image acquisition sensor (CMOS camera, CCD, etc.) at a location on an object that contains a bar code, data matrix, or other identification symbol, and retrieval of an image of that symbol. The identification symbol contains a set of predetermined patterns that represent an ordered group of characters or symbols from which an attached data processor (for example a microcomputer) can derive useful information about the object (e.g. its serial number, type, model, price, etc.). Identification symbols are available in a variety of shapes and sizes. Two of the most commonly employed symbol types are the so-called one-dimensional barcode, consisting a line of vertical stripes of varying width and spacing, and the so-called two-dimensional barcode consisting of a two-dimensional array of dots or rectangles.

In reading identification symbols or other subjects of interest the type of illumination employed is of particular concern. Where barcodes and other viewed subjects are printed on a flat surface with contrasting ink or paint, a diffuse, high-angle "bright field" illumination may best highlight these features for the sensor. By high-angle it is meant, generally, light that strikes the subject nearly perpendicularly (normal) or at an angle that is typically no less than about 45 degrees from perpendicular (normal) to the surface of the item being scanned. Such illumination is subject to substantial reflection back toward the sensor. By way of example, barcodes and other subjects requiring mainly bright field illumination may be present on a printed label adhered to an item or container, or on a printed field in a relatively smooth area of item or container.

Conversely, where a barcode or other subject is formed on a more-irregular surface or is created by etching or peening a pattern directly on the surface, the use of highly reflective bright field illumination may be inappropriate. A peened/etched surface has two-dimensional properties that tend to scatter bright field illumination, thereby obscuring the acquired image. Where a viewed subject has such decidedly two-dimensional surface texture, it may be best illuminated with dark field illumination. This is an illumination with a characteristic low angle (approximately 45 degrees or less, for example) with respect to the surface of the subject (i.e. an angle of more than approximately 45 degrees with respect to normal). Using such low-angle, dark field illumination, two-dimensional surface texture is contrasted more effectively (with indents appearing as bright spots and the surroundings as shadow) for better image acquisition.

To take full advantage of the versatility of a camera image sensor, it is desirable to provide both bright field and dark field illumination for selective or simultaneous illumination of a subject. However, dark field illumination must be presented close to a subject to attain the low incidence angle thereto. Conversely, bright field illumination is better produced at a relative distance to ensure full area illumination.

In the situation where a barcode or other subject is formed on a specular surface, non-directional totally diffuse bright field illumination is preferred. This type of illumination, like that naturally produced on a cloudy day must surround the object upon which the barcode is placed. In typical machine vision applications, non-directional totally diffuse illumination is difficult and costly to provide, usually by way of surrounding a workpiece with a light tent.

BRIEF SUMMARY OF THE INVENTION

In one aspect the present invention provides diffuse illumination in a hand held reader to produce high contrast images of symbols and barcodes. A tapered translucent diffuser is disposed between the imager and the region of interest with illumination behind the diffuser directed toward the region of interest. The tapered diffuser converts bright field illumination into totally diffused non-directional illumination. The narrow end of the tapered diffuser surrounds the lens at a position near to the lens of the reader. The wide end of the tapered diffuser surrounds the field of view near the region of interest. Accordingly, the field of view is flooded with diffuse illumination.

In another aspect of the invention, diffuse illumination is produced in addition to low angle dark field illumination. In this aspect of the invention, a passive light pipe that produces low angle dark field illumination is positioned around the diffuser. Alternatively, an active light pipe surrounds the diffuser, with dark field illuminators directly projecting illumination at a low angle with respect to the region of interest. The reader can be configured to selectively actuate either the diffuse illumination from the tapered diffuser, or exclusive dark field illumination from the dark field light pipes, or a combination of both diffuse illumination and dark field illumination.

In yet another aspect of the invention, in addition to the tapered diffuser that surrounds the lens at the narrow end of the diffuser, diffused illumination directed to a semi-transparent mirror positioned in front of the lens and aligned so that a portion of the light reflecting from the region of interest is projected into the lens, while a portion of the diffuse illumination is reflected onto the region of interest. In this aspect of the invention, uniform diffuse illumination can be projected onto the region of interest without producing a reflection of the lens in the image.

Other objects and advantages of the present invention will become apparent from the following detailed description, the accompanying drawings, and the appended claims.

BRIEF DESCRIPTION OF THE SEVERAL VIEWS OF THE DRAWINGS

The present invention is further described in the detailed description which follows, by reference to the noted drawings by way of non-limiting illustrative embodiments, in which like reference numerals represent similar part throughout the several views of the drawings, and wherein:

FIG. 12 is a schematic cross section of an illustrative embodiment of the present invention;

FIG. 13 is a schematic cross section of an illustrative embodiment of the present invention;

DETAILED DESCRIPTION OF THE INVENTION

Figure 1:
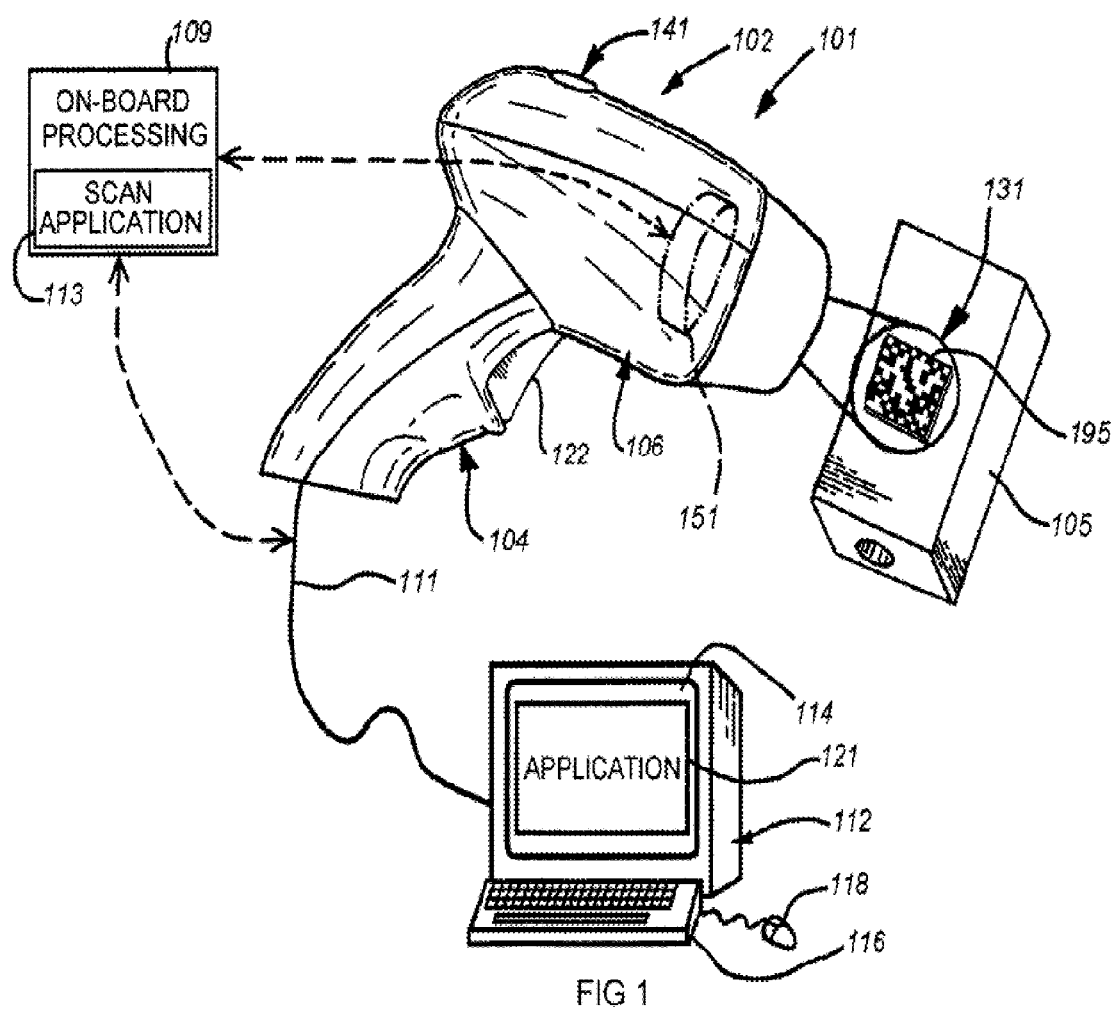
FIG. 1 is a perspective view of a handheld scanning system and an object having a symbol thereon.

FIG. 1 shows a scanning system 101 adapted for handheld operation. An exemplary handheld scanning appliance or handpiece 102 is provided. It includes a grip section 104 and a body section 106. An image formation system 151, shown in phantom and described herein, can be controlled and can direct image data to an onboard embedded processor 109. This processor can include a scanning software application 113 by which lighting is controlled, images are acquired and image data is interpreted into usable information (for example, alphanumeric strings derived from the barcode images). The decoded information can be directed via a cable 111 to a PC or other data storage device 112 having (for example) a display 114, keyboard 116 and mouse 118, where it can be stored and further manipulated using an appropriate application 121. Alternatively, the cable 111 can be directly connected to an interface in the scanning appliance and an appropriate interface in the computer 112. In this case the computer-based application 121 performs various image interpretation and lighting control functions as needed. The precise arrangement of the handheld scanning appliance with respect to an embedded processor, computer or other processor is highly variable. For example, a wireless interconnect can be provided in which no cable 111 is present. Likewise, the depicted microcomputer can be substituted with another processing device, including an onboard processor or a miniaturized processing unit such as a personal digital assistant or other small-scale computing device.

The scanning application 113 can be adapted to respond to inputs from the scanning appliance 102. For example, when the operator toggles a trigger 122 on the hand held scanning appliance 102, an internal camera image sensor (110, shown and described further below) acquires an image of a region of interest 131 on an object 105. The exemplary region of interest includes a two-dimensional symbol 195 that can be used to identify the object 105. Identification and other processing functions are carried out by the scanning application 113, based upon image data transmitted from the hand held scanning appliance 102 to the processor 109. A visual indicator 141 can be illuminated by signals from the processor 109 to indicate a successful read and decode of the symbol 195.

Figure 2:
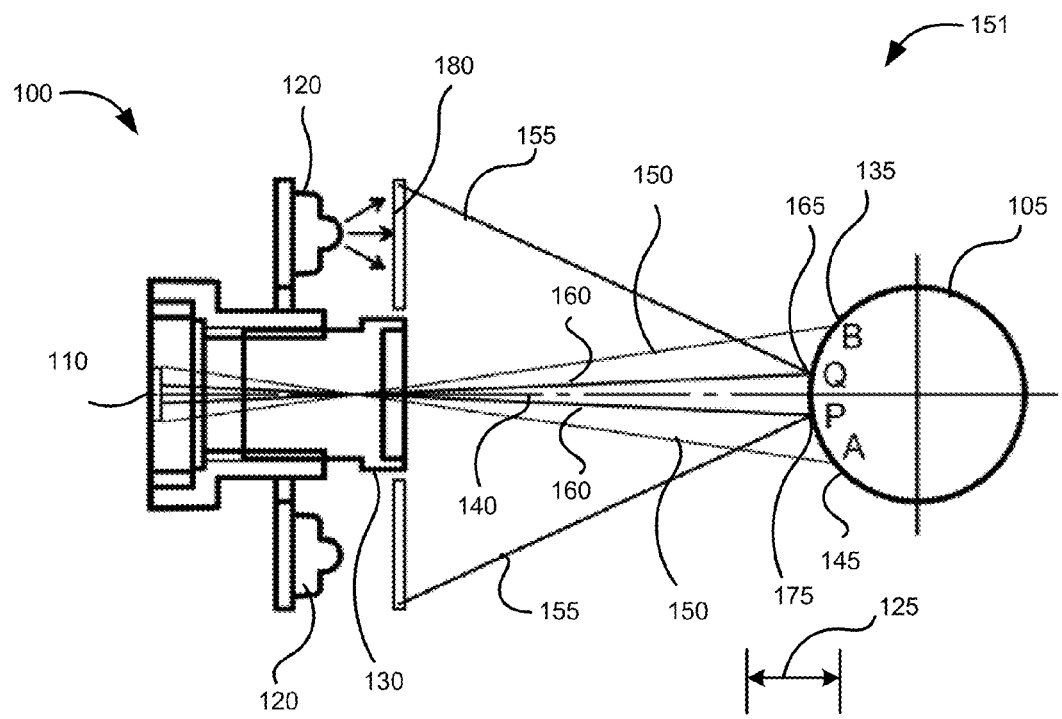
FIG. 2 is a schematic cross sectional view of an image formation system according to the prior art.

FIG. 2 depicts an image formation system 151 typically used in a hand held scanning appliance 102. FIG. 2 shows a cross sectional view of a prior art imaging system 100 for reading marks or symbols on an object 105. The imaging system 100 has an imager 110 that is one of a variety of types of photosensitive imaging sensors, such as a CMOS or CCD device. A lens 130 disposed in front of the imager 110 is configured to direct illumination onto the imager 110. The imager 110 and lens 130 together form an optical axis 140 that defines the center of a field of view, which is bound by the polyhedral volume defined as lines 150 in FIG. 2.

At a given focus setting, a sharply focused image of the surface of an object 105 will be projected by the lens 130 onto the imager 110 when the object is positioned at an appropriate distance from the imaging system 100. Optical properties of the system will affect the range of distance from which the object 105 can be positioned in front of the system 100 while projecting an image of the object 105 onto the imager 110 that exhibits features of sufficient sharpness and contrast so as to be perceived as a focused image. The range upon which a focused image can be formed on the imager 110 is a called the depth of field 125.

Illuminators 120 are shown in the system 100 for directing illumination towards the object 105. Typically, a diffuser 180 is disposed in front of the illuminators 120 to diffuse the illumination so that a uniform distribution of illumination can be spread over the surface of the object. Without the diffuser 180, the illumination from the illuminators 120 will appear as areas of high intensity illumination surrounded by areas of low intensity illumination. As shown in FIG. 2, the field of view of an image of a cylindrical object 105 is the portion of the surface of the object from point B 135 to point A 145.

Although the entire field of view is illuminated, only a portion of the reflective surface (from point P 175 to point Q 165) will reflect light into the imaging system 100. This results from the maximum angle of illumination, depicted as lines 155 in FIG. 2, that can be reflected into the imaging system 100, depicted as lines 160 in FIG. 2, being significantly less than the field of view. The image of a cylindrical object using the prior art imaging system 100 will depict a brightly illuminated band over the area defined by lines through points P and Q.

Figure 3:
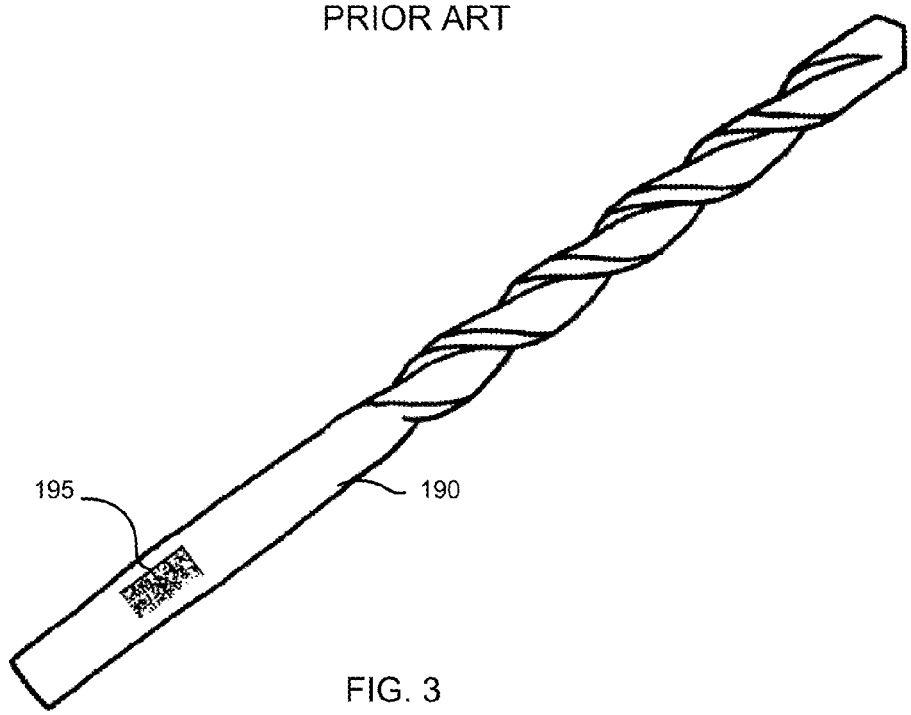
FIG. 3 is a perspective view of a representative object having a two-dimensional symbol marked thereon, according to the background art.
Figure 4:
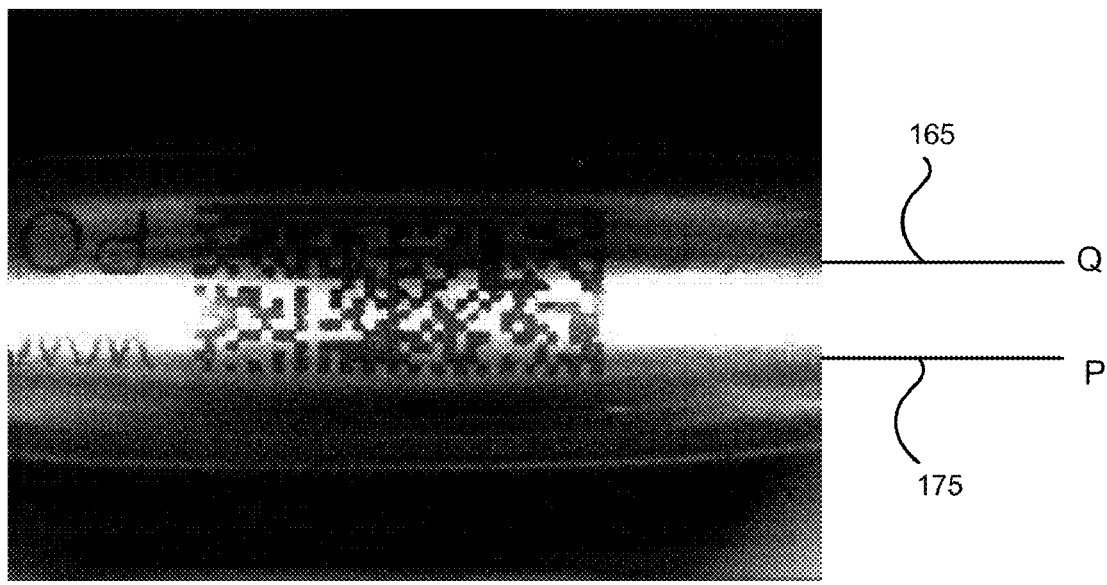
FIG. 4 is an image of a two dimensional symbol on a specular cylindrical object acquired using an image formation system according to the prior art.

FIG. 3 depicts a two-dimensional data matrix symbol 195 etched on the surface of a cylindrical object, e.g., a drill bit 190. Presenting the exemplary drill bit 190 to the imaging system 100 will produce an image of the symbol 195 as shown in FIG. 4. A brightly illuminated band can be observed between the regions defined as lines P 175 and Q 165. The illumination that strikes the remaining portion of the object does not reflect into the optics of the imaging system 100, and therefore, the image is too dark to produce a clear representation of the data matrix symbol so that decoding algorithms can be applied to decode the symbol.

Figure 5:
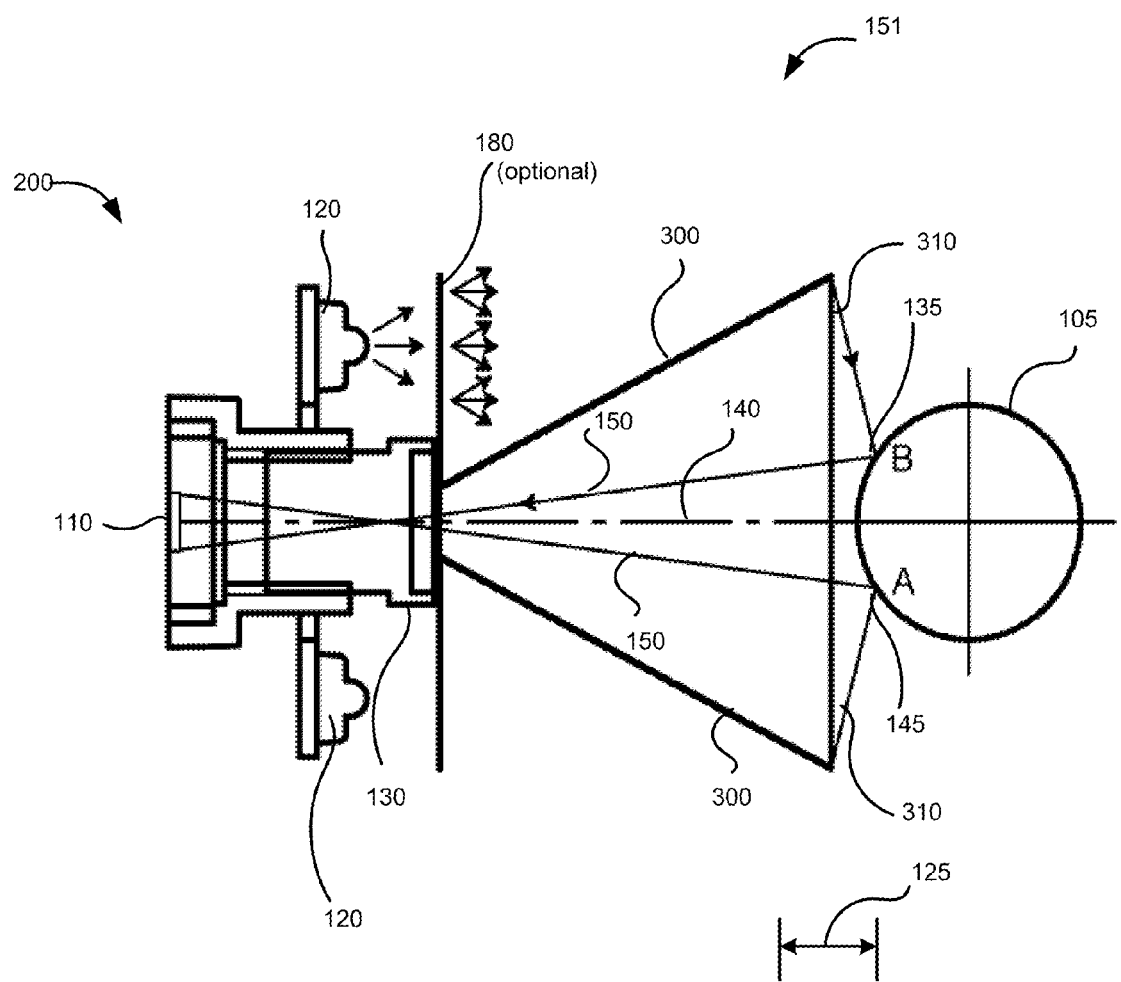
FIG. 5 is a schematic cross sectional view of an image formation system according an illustrative embodiment of the present invention.

FIG. 5 depicts an improved imaging system 200 according to the present invention that can be used as an image formation system 151 in a hand held scanning appliance 102. The improved system 200 has an imager 110 that is one of a variety of types of photosensitive imaging sensors, such as a CMOS or CCD device. A lens 130 disposed in front of the imager 110 is configured to direct illumination onto the imager 110. The imager 110 and lens 130 together form an optical axis 140 that defines the center of a field of view, which is bound by the polyhedral area defined as lines 150 in FIG. 4

At a given focus setting, a sharply focused image of the surface of the object 105 will be projected by the lens 130 onto the imager 110 when the object is positioned at an appropriate distance from the improved system 200. Optical properties of the system will affect the range of distance from which the object 105 can be positioned in front of the improved system 200 while projecting an image of the object 105 onto the imager 110 that exhibits features of sufficient sharpness and contrast so as to be perceived as a focused image. The range upon which a focused image can be formed on the imager 110 is called the depth of field 125.

Illuminators 120 are shown in the improved system 200 for directing illumination towards the object 105. Optionally, a diffuser 180 can be used to diffuse the bright field illumination. In an illustrative embodiment of the present invention, a conical diffuser 300 is disposed between the lens 130 and the object 105. One skilled in the art will appreciate that while the illustrative embodiment describes a conical shaped diffuser 300, other embodiments can be employed with alternative shapes without departing from the scope of the invention. For example, parabolic, cylindrical, and hemispherical shaped diffusers can be used as a diffuser 300.

Figure 6:
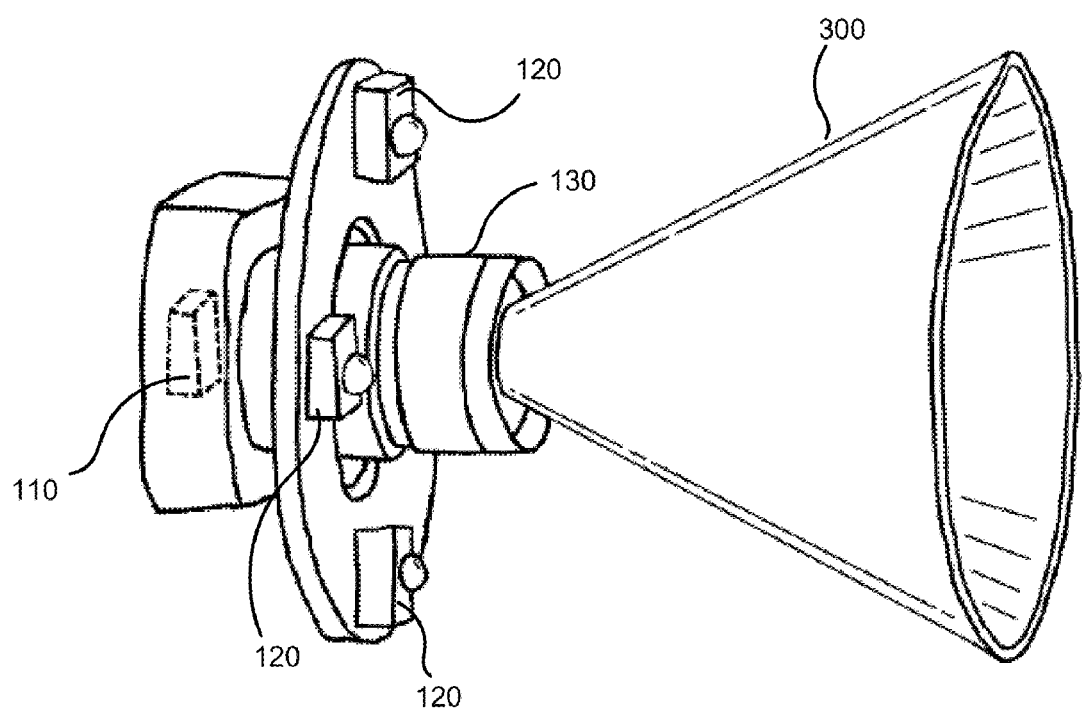
FIG. 6 is a perspective view of an illustrative embodiment of an image formation system according to the present invention.

FIG. 6 depicts a perspective view of the basic elements of the illustrative embodiment of the present invention. The conical diffuser 300 is constructed from an translucent plastic material, such as polymethyl methacrylate (PMMA) with a roughened surface to achieve the optical property of translucency. In an embodiment of the invention, the optical properties of the diffuser 300 has translucency like that of ordinary white paper, in that illumination will cause the surface of the diffuser to appear bright. The conical diffuser 300 can be molded with a rough mold surface, or sandblasted to roughen the normally clear material to be translucent. The diffuser 300 is configured so that a first distal end, the narrow opening, of the diffuser surrounds the opening of the lens 130 and aligned with the imager 110 (shown in phantom). The illuminators 120 are distributed around the lens 130 so that an even distribution of illumination can be projected.

Referring back to FIG. 5, the entire field of view is illuminated with diffuse illumination since the second distal end of the diffuser 300 surrounds the field of view near the object 105. The maximum angle of illumination from the diffuser 300, shown as line 310 strikes the object 105 within the region defined as the field of view between point A 145 and point B 135, reflecting toward the lens 130 and the imager 110 as lines 150. Illumination from the diffuser that strikes the object outside of that region is outside the field of view, and therefore, not captured by the imager 110.

Figure 7:
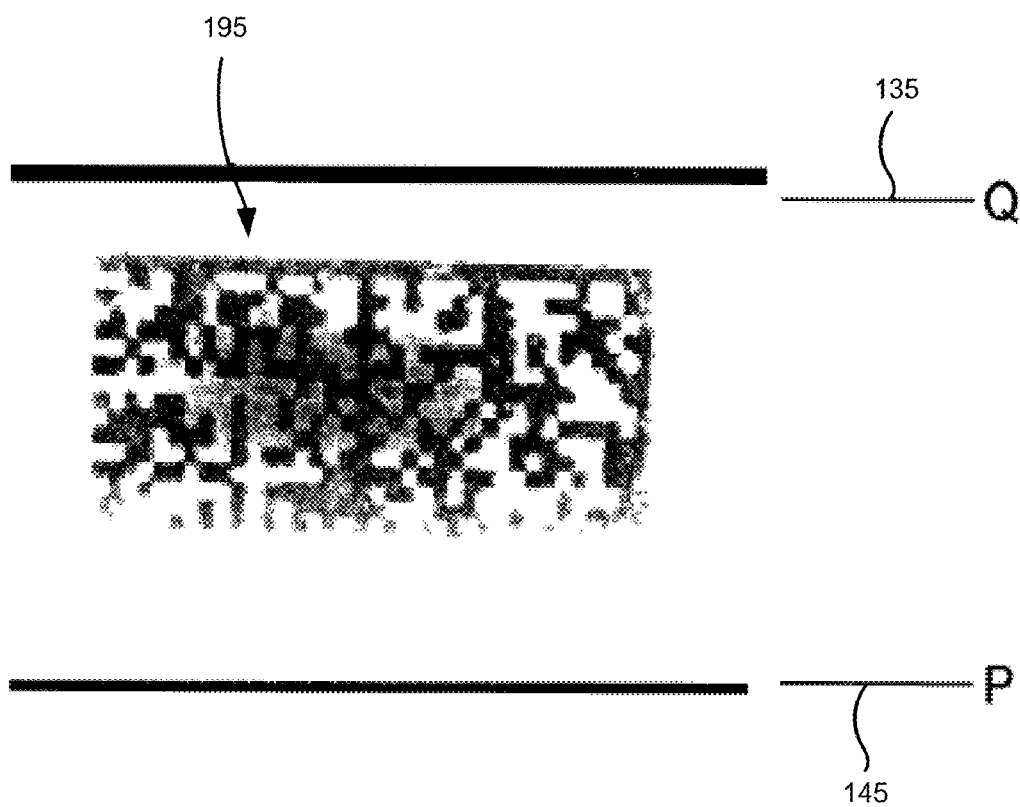
FIG. 7 is an image of a two dimensional symbol on a specular cylindrical object acquired using an image formation system according to the present invention.

Presenting the exemplary drill bit 190 (FIG. 3) to the improved imaging system 200, an image of the data matrix symbol 195 will be formed like that shown in FIG. 7. The entire data matrix symbol 195 is visible, since the region defined as the field of view between point A 145 and point B 135 receive diffuse illumination, and therefore, decoding algorithms operating on the image can readily extract the encoded information.

Figure 8:
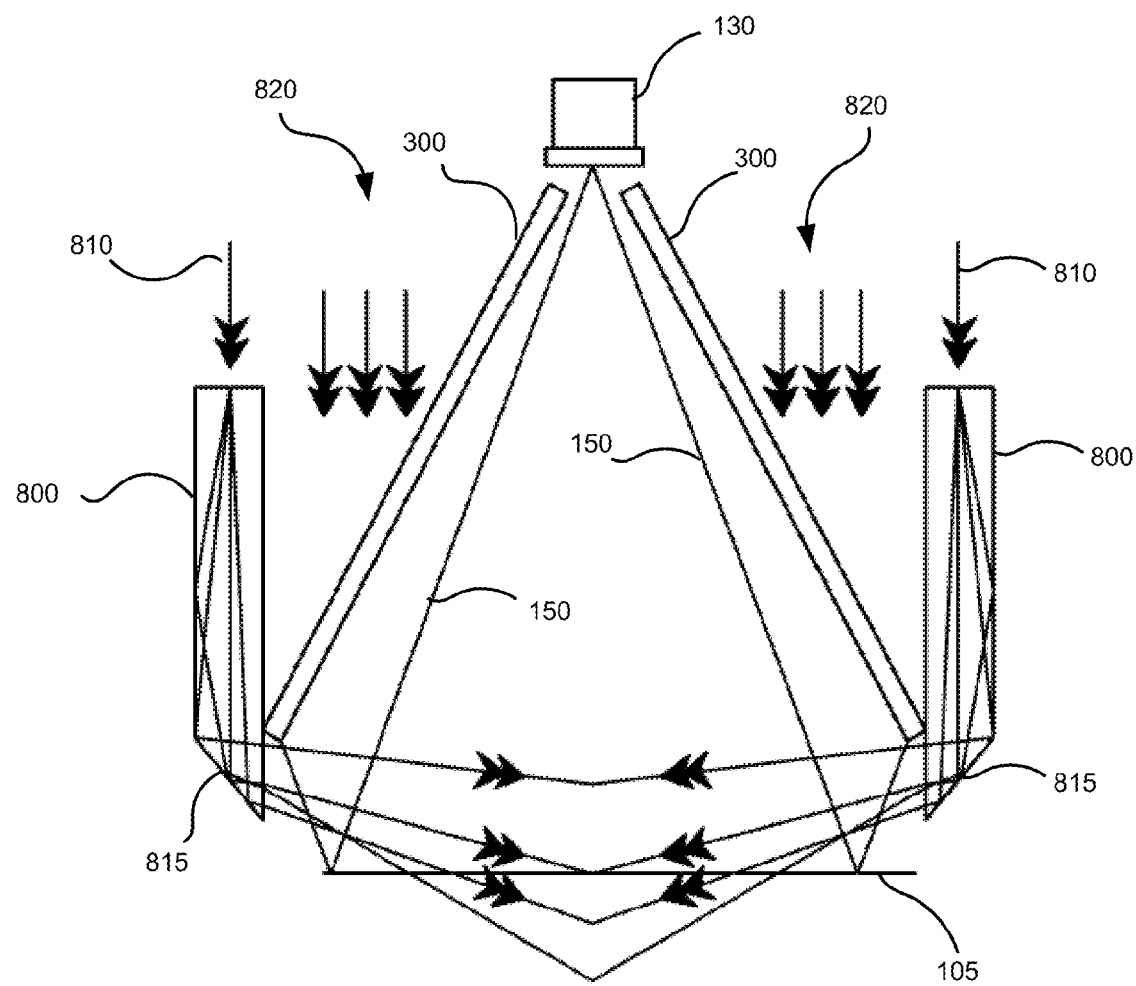
FIG. 8 is a schematic cross section of an illustrative embodiment of the present invention.

FIG. 8 shows another implementation of the diffuser 300 with a passive light pipe 800, shown in cross section relative to the lens 130, to provide diffuse illumination in combination with, or in the alternative to dark field illumination. Dark field illumination 810 is directed into the light pipe 800 that is internally reflected at a chamfered portion 815 to be directed at the object 105 at a low angle. Further information regarding the design and implementation of passive light pipes with selectively actuated illumination to provide dark field illumination can be found in commonly assigned U.S. patent application Ser. No. 10/693,626, incorporated herein by reference. Bright field illumination 820 is converted into totally diffuse illumination by the diffuser 300, to project diffuse illumination on the object 105 within the field of view, depicted as the region defined by lines 150. Optionally, the diffuser 300 can be removably attached to the hand held scanning appliance 102 so that a user can operate the hand held scanning appliance using non-diffuse bright field illumination. The removability of the diffuser 300 can be achieved by incorporating snap-fit clearances and/or features in the diffuser and light pipe that permit removable assembly (not shown).

When dark field illumination is exclusively applied to the object 105 in the embodiment of the invention according to FIG. 8, scattered illumination may reflect from the object 105 and then from the diffuser 300 to unintentionally cause diffuse illumination on the object 105. This condition may be undesirable for reading certain parts that are best imaged with low angle dark field illumination, such as peened data matrix marks on a highly specular surface.

Figure 9:
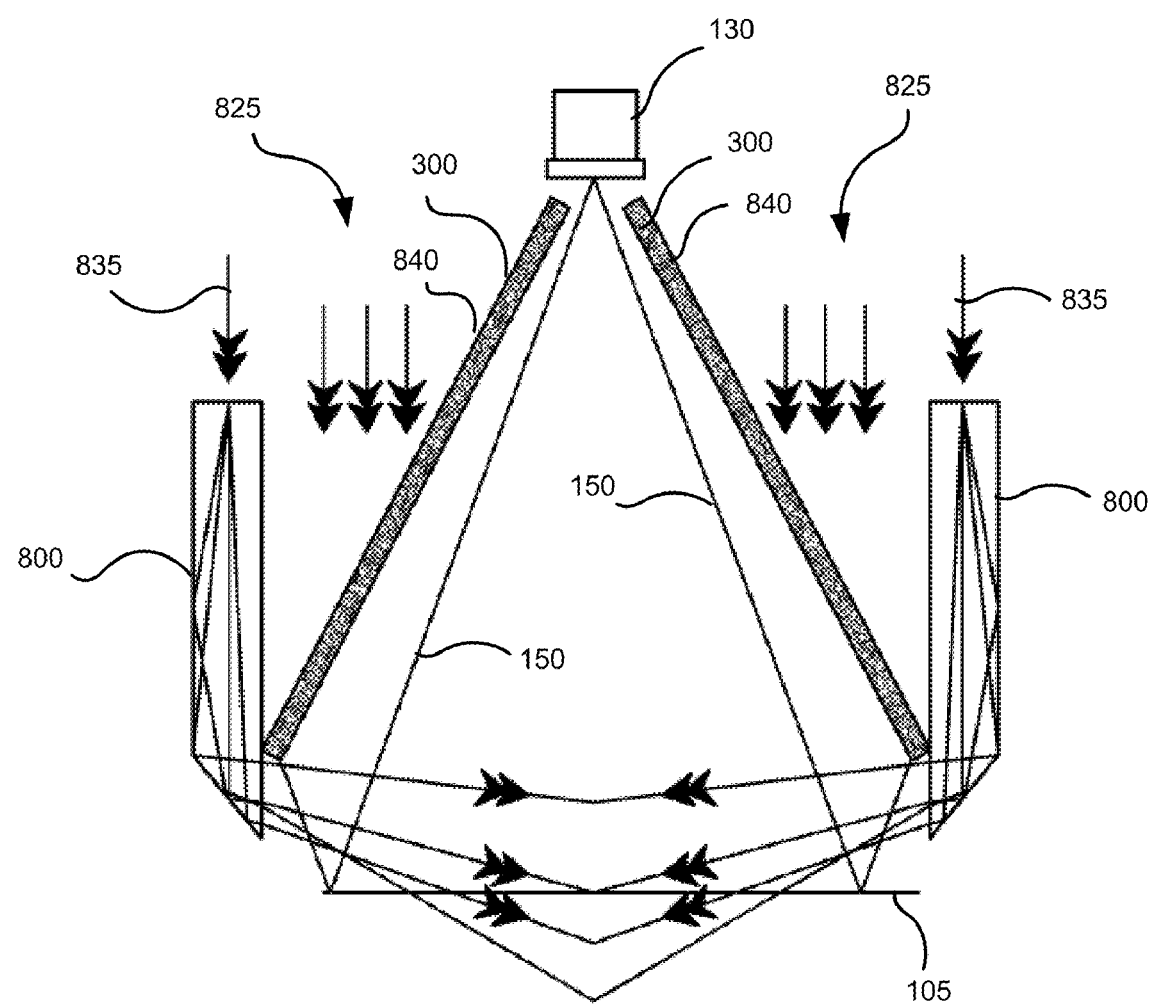
FIG. 9 is a schematic cross section of an illustrative embodiment of the present invention.

FIG. 9 shows an alternate embodiment of the implementation of the diffuser 300 with a passive light pipe 800, shown in cross section relative to the lens 130, to provide selectively exclusive dark field illumination or diffuse illumination. In this embodiment, a color specific dark field illumination 835 is projected into the light pipe 800. The diffuser 300 is fabricated with a material 840 having a color characteristic different from the color of the color specific dark field illumination 835, and illuminated with color specific bright field illumination 825 that matches the color characteristic of the material 840. In this embodiment, when the color specific dark field illumination is exclusively actuated, the low angle dark field illumination is projected onto the object 105, and any scattered illumination reflecting from the object 105 and then the diffuser 300 will not be converted into totally diffuse illumination.

In an illustrative embodiment according to FIG. 9, the color specific dark field illumination 835 is red, and the color specific bright field illumination is blue, with the material 840 having a blue color. In this embodiment, if only low angle dark field illumination is desired, the red dark field illumination 835 is turned on, with the blue bright field illumination turned off. The low angle red illumination striking the object, if scattered to reflect off the blue colored material 840 of the diffuser 300, will not appear bright in an image, and therefore not contribute to the illumination of the object with totally diffuse illumination. Conversely, if the blue bright field illumination 825 is turned on, the blue colored material 840 of the diffuser will transmit and diffuse the illumination to provide totally diffuse illumination of the object 105 within the field of view, depicted as the region defined by lines 150. One skilled in the art will appreciate that alternative color characteristics, such as red/infrared can be employed according to the illustrative embodiment of FIG. 9.

Figure 10:
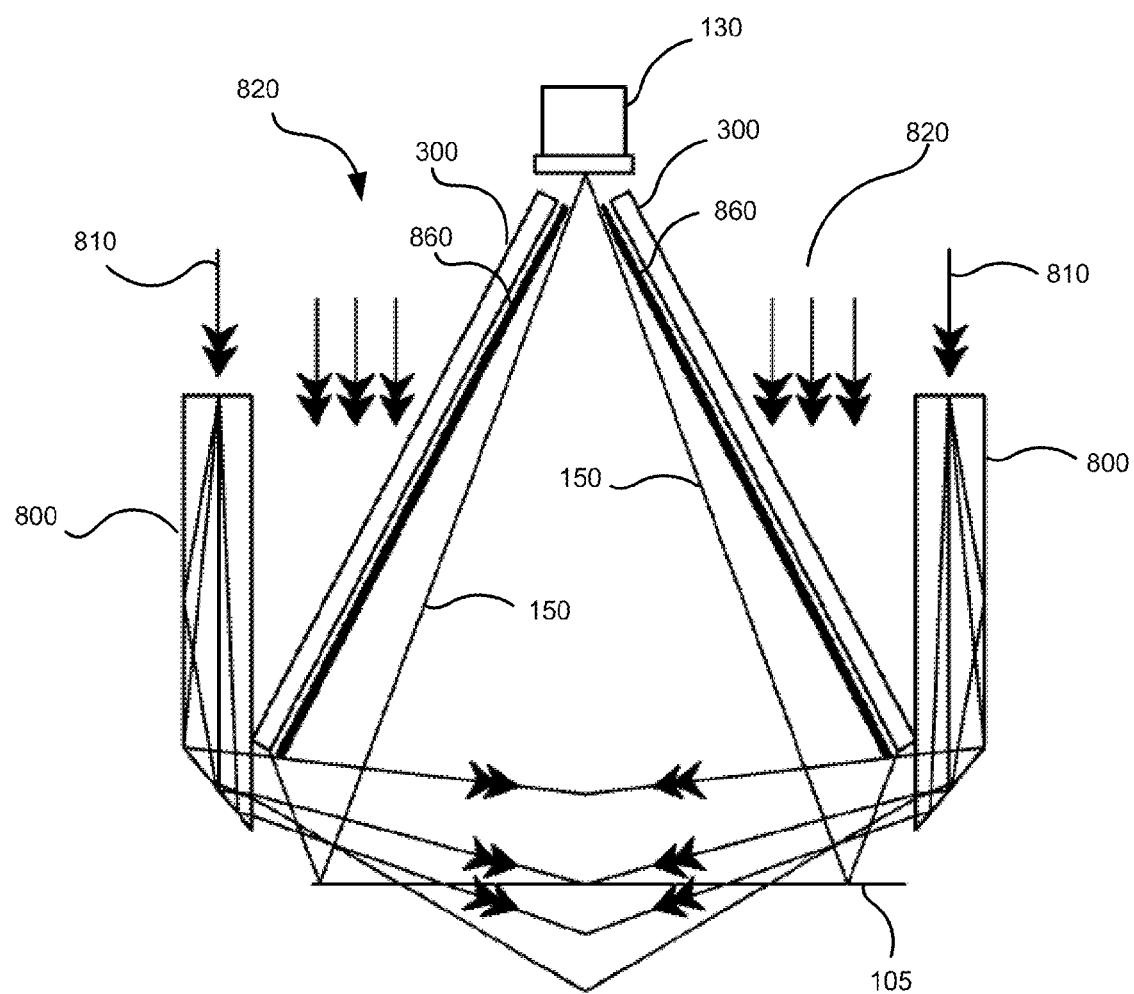
FIG. 10 is a schematic cross section of an illustrative embodiment of the present invention.

FIG. 10 shows another illustrative embodiment of the implementation of the diffuser 300 with a passive light pipe 800, shown in cross section relative to the lens 130, to provide selectively exclusive dark field illumination or diffuse illumination. In this illustrative embodiment, dark field illumination 810 is projected into the light pipe 800 to produce low angle dark field illumination while the bright field illumination 820 is turned off. A light absorbing foil 860, such as a neutral density filter material is applied to the interior surface of the diffuser 300. Low angle dark field illumination that reflects off the object 105 is absorbed by the foil filter 860 so that totally diffuse illumination is not reflected back onto the object. If diffuse illumination is desired, either instead of dark field illumination, or in combination with dark field illumination, the bright field illumination 820 is turned on. The intensity of the bright field illumination 820 would need to be increased to compensate for the absorption of such illumination by the foil filter 820. With the bright field illumination actuated, totally diffuse illumination will transmit from the diffuser 300, through the foil filter 860, and onto the object within the field of view, depicted as the region defined by lines 150.

Figure 11:
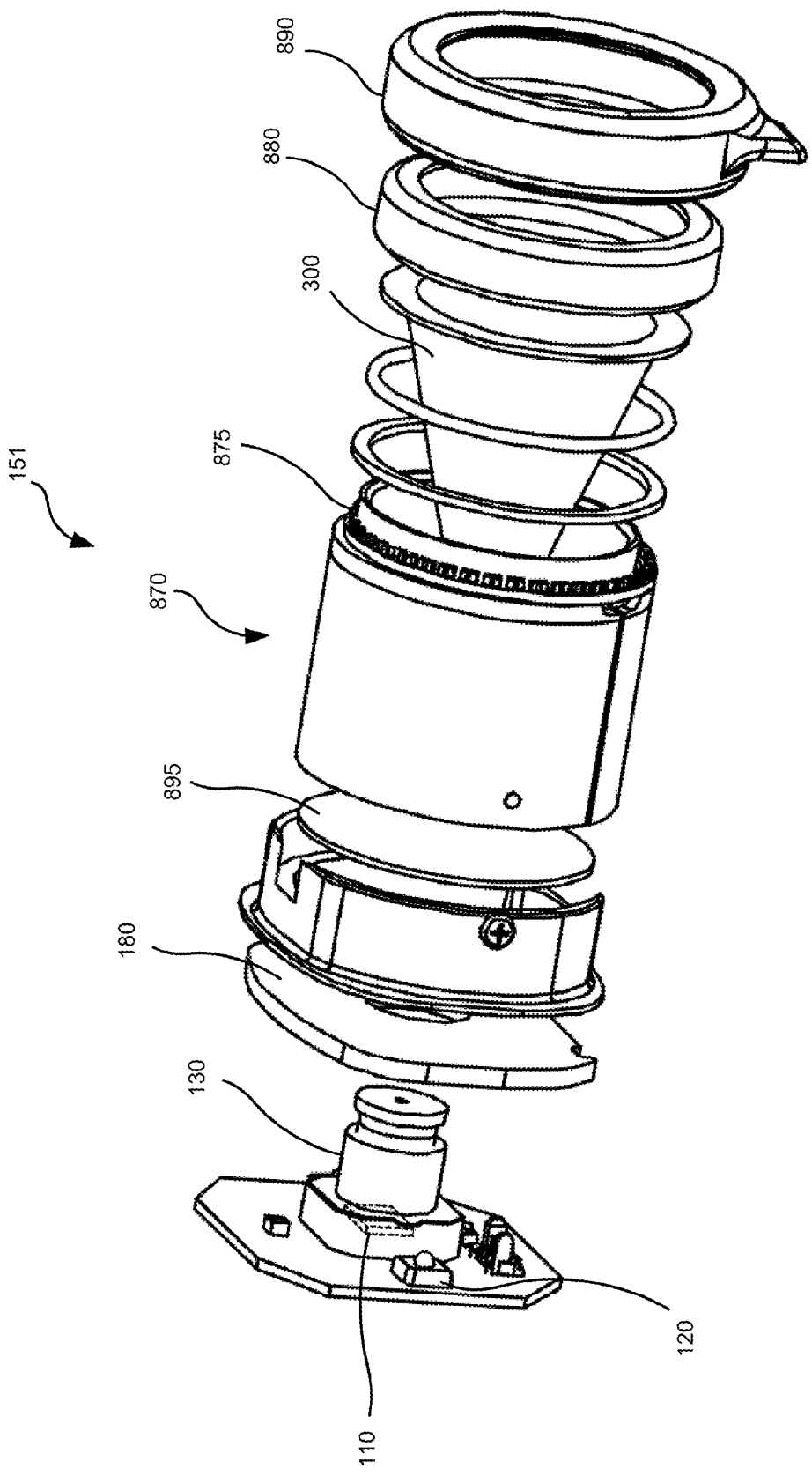
FIG. 11 is an exploded perspective view of an image formation system according to an illustrative embodiment of the present invention.

FIG. 11 depicts another illustrative embodiment of the implementation of the diffuser 300 as an image formation system 151 in a hand held scanning appliance 102. In the illustrative embodiment according to FIG. 11, the diffuser 300 is inserted into an active light pipe 870. The active light pipe 870 provides low angle dark field illumination from a ring of dark field illuminators 875, as disclosed in the commonly assigned International Patent Application WO02/075637, incorporated herein by reference. The dark field illuminators 875 are held in place with a threaded collar 880, and flexible sleeve 890. Bright field illuminators 120 project bright field illumination that is diffused by an optional diffuser 180, that is diffused over the entire field of view by the diffuser 300. A transparent window 895 protects the lens 130 and other internal components from the operating environment.

In the illustrative embodiment according to FIG. 11, the conical diffuser 300 can be positioned to diffuse the dark field illumination from the dark field illuminators 875, or optionally constructed to permit illumination from the dark field illuminators 875 to project onto the object at low angle without being diffused. This optional configuration can be achieved by inserting the conical diffuser 300 further into the active light pipe 870 toward the lens 130 to expose the dark field illuminators 875, or by constructing the conical diffuser 300 to have a transparent optical property at the distal end where it is disposed in front of the dark field illuminators 875. When the hand held scanning appliance having an image formation system 151 according to the illustrative embodiment according to FIG. 11 is operated, the user can configure or select exclusive dark field illumination or exclusive diffuse illumination, or a combination of both modes of illumination thereof.

In the illustrative embodiment according to FIG. 11, the conical diffuser 300 can be optionally removed from the image formation system 151 so that the hand held scanning appliance 102 can be operated without diffuse illumination. This condition may be desired if high intensity non-diffuse bright field illumination, or if exclusive dark field illumination is required. The removable aspect of the diffuser 300 can be achieved by unscrewing the threaded collar 880 to remove the diffuser 300, and re-threading the collar 880 without the diffuser in place.

FIG. 12 shows a schematic representation of the effect of illuminating an object 105 having a highly specular surface 910 according to the present invention. The resulting image 920 will exhibit features 925 associated with a reflection of the lens 130. Though the field of view 930, as defined as the region bound by lines 150, will be illuminated with totally diffuse illumination from the diffuser 300, the image 920 will exhibit a darkened region of features 925 that is a reflection of light not emanating from the diffuser 300.

FIG. 13 shows an illustrative embodiment of the invention that further improves the uniform distribution of diffuse illumination over the field of view according to the present invention. Bright field illumination 820 is converted into totally diffuse illumination by the diffuser 300, to project diffuse illumination on the object 105 within the field of view, depicted as the region defined by lines 150. A semi-reflecting mirror 950 is disposed in front of the lens 130, and behind the diffuser at an appropriate angle so that the image of the field of view is projected into the lens 130. A second bright field illumination source 935 is directed toward the semi-reflecting mirror 950, with a second diffuser 940 disposed between the second illumination source 935 and the semi-reflecting mirror 950. The second diffuser 940 is composed of the same material as the diffuser 300, with the same translucent optical properties. One skilled in the art will appreciate that a single diffuser can be fabricated or molded that can provide the functionality of both the diffuser 300 and the second diffuser 940. The intensity of the second illumination source 935 may require an increased level during operation since a portion of the illumination 935 will not be reflected onto the object 105, but rather through the semi-reflecting mirror into the body of the hand held scanning appliance 102. By adjusting the intensity level of the second illumination 935, an even distribution of diffuse illumination can be achieved over the entire field of view 930.

Figure 14:
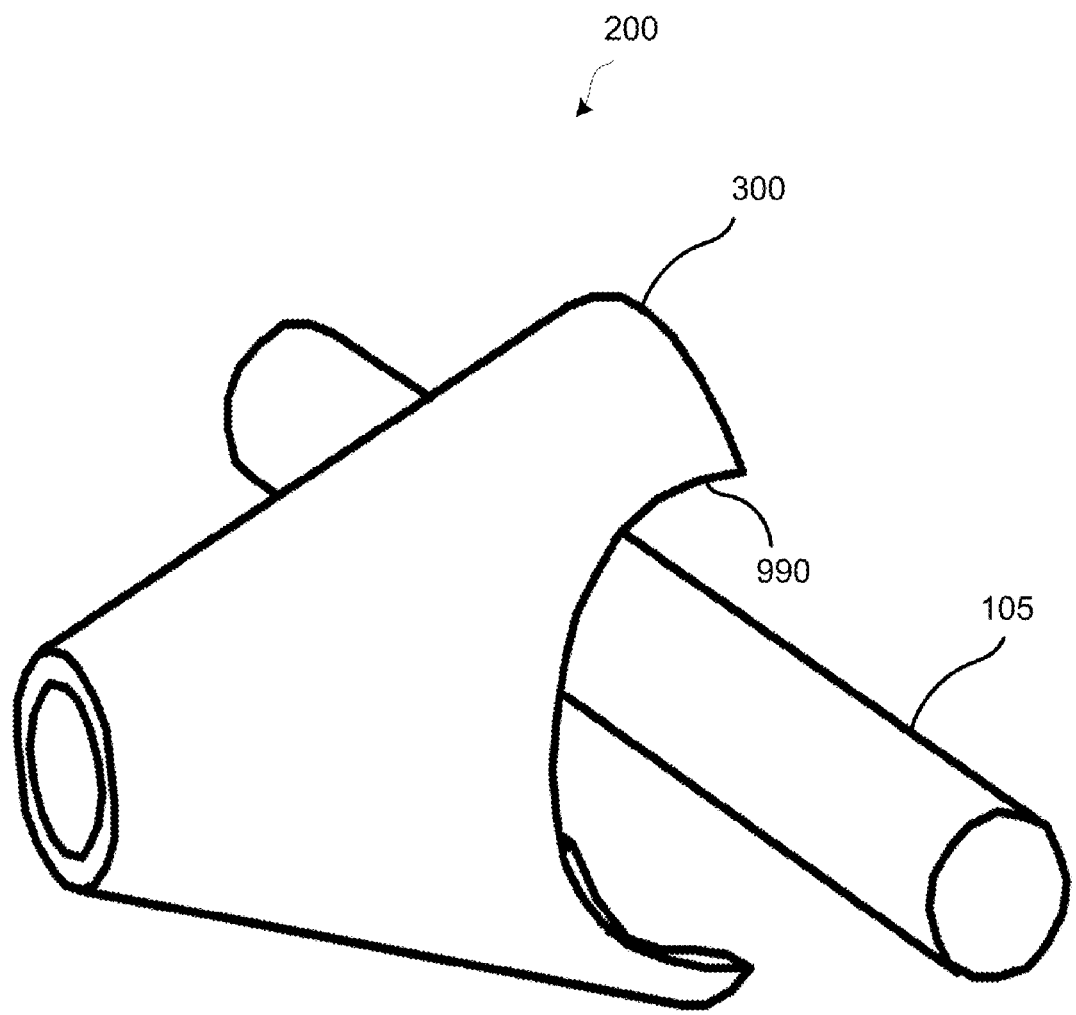
FIG. 14 is a perspective view of an illustrative embodiment of the present invention with the diffuser according to the invention adapted with a cylindrical shape.

FIG. 14 shows an illustrative embodiment of the invention that provides a cylindrical shape 990 in the diffuser 300 so that an object 105 having an extended length can be presented to the improved imaging system 200. The cylindrical shape 990 of the diffuser provides relief so that the diffuser 300 can increase an area of diffuse illumination pattern on a reflective cylindrical object. Further, the cylindrical shape 990 provides an aiming assistance to the user.

Figure 15:
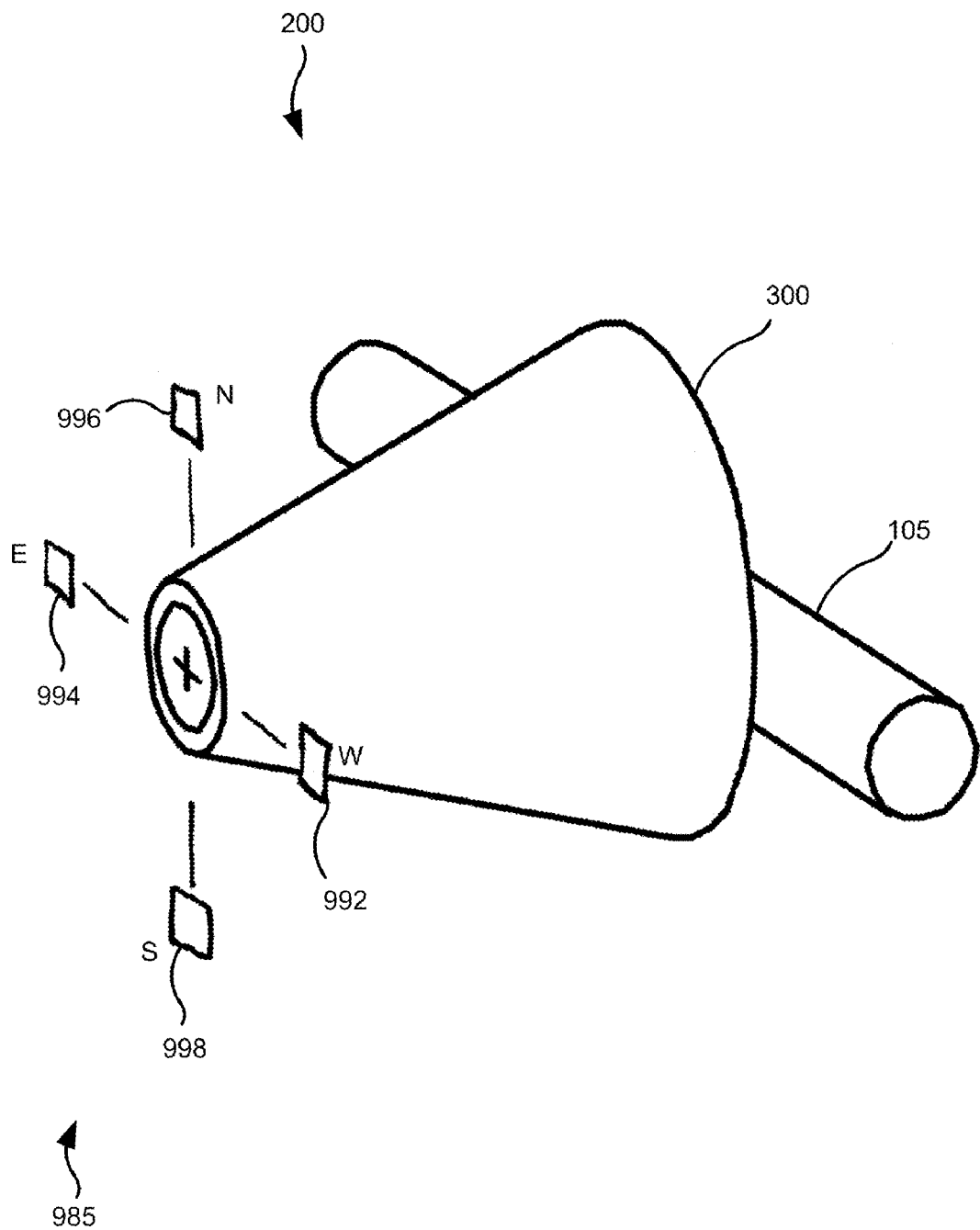
FIG. 15 is a perspective view of an illustrative embodiment of the present invention with selective quadrant diffuse illumination.

FIG. 15 shows a plurality of selectively actuated illuminators 985 that can provide selective illumination of the diffuser 300. In this illustrative embodiment, the North illuminator 996 can be actuated with the South illuminator 998 while the East illuminator 994 and the West illuminator 992 are not actuated. Conversely, the East illuminator 994 and the West illuminator 992 can be actuated while the North illuminator 996 and the South illuminator 998 are not actuated. Selective quadrant illumination according to this illustrative embodiment permits an adjustment, or compensation, of the uniformity of the illumination that is converted into totally diffuse illumination by the diffuser 300, on an axis parallel with the axis of a specular object 105.

While the invention has been described with reference to certain illustrated embodiments, the words which have been used herein are words of description rather than words of limitation. Changes may be made, within the purview of the appended claims, without departing from the scope and spirit of the invention and its aspects. Although the invention has been described herein with reference to particular structures, acts and materials, the invention is not to be limited to the particulars disclosed, but rather extends to all equivalent structures, acts, and materials, such as are within the scope of the appended claims.

What is claimed is:

1. An apparatus for imaging a symbol on an object, the apparatus comprising:
   a hand held portable imaging system having an imager;
   a lens disposed between the imager and a region of interest, the region of interest being the intended position of the symbol on the object, the lens and imager defining a field of view and an optical axis;
   an illuminator adjacent to the lens, directing illumination towards the region of interest;
   a tapered translucent diffuser concentrically aligned with the optical axis, having a first distal end surrounding the field of view proximate to the lens, and a second distal end surrounding the field of view proximate to the region of interest, the tapered translucent diffuser tapering along the length of the tapered translucent diffuser from the first end toward the second end; and
   wherein the tapered translucent diffuser has a first color characteristic and wherein the illuminator emits illumination having a color characteristic similar to the first color characteristic.

2. The apparatus according to claim 1 wherein the tapered translucent diffuser is composed of polymethyl methacrylate.

3. The apparatus according to claim 2 wherein the tapered translucent diffuser is fabricated in an injection molding process.

4. The apparatus according to claim 1 wherein the tapered translucent diffuser has a conical shape.

5. The apparatus according to claim 1 wherein the tapered translucent diffuser has a cylindrical shape.

6. The apparatus of claim 5 wherein the diffuser has a narrow end and a wide end and wherein the narrow end is proximate the imager while the wide end is proximate the region of interest.

7. The apparatus according to claim 1 wherein the illumination directed towards the region of interest is diffused by the translucent diffuser to provide diffuse illumination to the field of view.

8. The apparatus of claim 1 wherein the diffuser is removably attached.

9. The apparatus of claim 1 wherein the diffuser has a distal edge adjacent the region of interest and wherein the distal edge forms a recess in which at least a portion of an object including the symbol to be imaged is receivable.

10. The apparatus of claim 1 wherein the illuminator further comprises a plurality of selectively actuated illuminators.

11. The apparatus of claim 10 wherein the plurality of selectively actuated illuminators have a north-south and east-west selective actuation.

12. The apparatus of claim 1 wherein illuminator light passes through the transparent diffuser toward the region of interest.

13. The apparatus of claim 1 further comprising a light absorbing filter applied to the diffuser and disposed between the diffuser and the region of interest.

14. An apparatus for imaging a symbol on an object, the apparatus comprising:
   a hand-held portable imaging system having an imager;
   a lens disposed between the imager and a region of interest, the region of interest being the intended position of the symbol on the object, the lens and imager defining a field of view and an optical axis;
   a first illuminator adjacent to the lens, directing illumination towards the region of interest;
   a semi-reflecting mirror disposed in front of the lens aligned with the optical axis configured to direct at least a portion of illumination reflected from the region of interest into the lens;
   a second illuminator directing illumination at the semi-reflecting mirror so that at least a portion of the illumination from the second illuminator is directed towards the region of interest;
   a first diffuser disposed between the second illuminator and the semi-reflecting mirror; and
   a tapered translucent diffuser concentrically aligned with the optical axis, having a first distal end surrounding the field of view proximate to the lens, and a second distal end surrounding the field of view proximate to the region of interest, the translucent diffuser tapering along the length of the diffuser from the first end toward the second end.

15. The apparatus according to claim 14 wherein the first illuminator has a first intensity, and the second illuminator has a second intensity, so as to configure the apparatus to produce a uniform distribution of illumination over the field of view at the region of interest.

16. The apparatus of claim 14 wherein the illumination from the first illuminator that is directed towards the region of interest is diffused by the translucent diffuser to provide diffuse illumination to the field of view.

17. The apparatus of claim 14 wherein the first and second illuminators have different intensities.

18. The apparatus of claim 14 wherein the first diffuser and the transparent diffuser are composed of the same material.

19. The apparatus of claim 14 wherein a single diffuser member forms both the first diffuser and the translucent diffuser.

20. The apparatus of claim 14 further including a dark field illumination subassembly concentrically aligned with the optical axis and surrounding the tapered translucent diffuser.

21. The apparatus of claim 14 wherein the translucent diffuser is removably attached.

22. An apparatus for imaging a symbol on an object, the apparatus comprising:
   a hand held portable imaging system having an imager;
   a lens disposed between the imager and a region of interest, the region of interest being the intended position of the symbol on the object, the lens and imager defining a field of view and an optical axis;
   an illuminator adjacent to the lens, directing illumination towards the region of interest;
   a translucent diffuser concentrically aligned with the optical axis, having a first distal end surrounding the field of view proximate to the lens, and a second distal end surrounding the field of view proximate to the region of interest, the translucent diffuser having a shape such that the portion of the translucent diffuser adjacent the first end of the translucent diffuser is closer to the optical axis than the portion of the translucent diffuser adjacent the second end of the translucent diffuser and so that the first and second translucent diffuser ends are spaced apart along a length dimension of the translucent diffuser which is aligned with the optical axis and wherein light from the illuminator passes through at least a portion of the translucent diffuser toward the region of interest; and
   wherein the translucent diffuser has a first color characteristic and wherein the illuminator emits illumination having a color characteristic similar to the first color characteristic.

23. An apparatus for imaging a symbol on an object, the apparatus comprising:
- a hand-held portable imaging system having an imager;
- a lens disposed between the imager and a region of interest, the region of interest being the intended position of the symbol on the object, the lens and imager defining a field of view and an optical axis;
- a semi-reflecting mirror disposed in front of the lens aligned with the optical axis configured to direct at least a portion of illumination reflected from the region of interest into the lens;
- a first bright field illuminator adjacent the lens and directing illumination towards the region of interest; and
- a second bright field illuminator directing illumination at the semi-reflecting mirror so that at least a portion of the illumination from the second illuminator is directed towards the region of interest.

24. The apparatus of claim 23 further including a transparent diffuser disposed between the first bright field illuminator and the region of interest.

* * * * *